(12) United States Patent
Yuzawa et al.

(10) Patent No.: US 10,810,163 B2
(45) Date of Patent: Oct. 20, 2020

(54) STORAGE MANAGEMENT COMPUTER, STORAGE MANAGEMENT METHOD, AND RECORDING MEDIUM

(71) Applicant: HITACHI, LTD., Tokyo (JP)

(72) Inventors: Hiroki Yuzawa, Tokyo (JP); Yuki Shimizu, Tokyo (JP); Daisuke Miyazaki, Tokyo (JP); Hiroyuki Yamada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 362 days.

(21) Appl. No.: 15/743,584

(22) PCT Filed: Jan. 27, 2016

(86) PCT No.: PCT/JP2016/052383
§ 371 (c)(1),
(2) Date: Jan. 10, 2018

(87) PCT Pub. No.: WO2017/130337
PCT Pub. Date: Aug. 3, 2017

(65) Prior Publication Data
US 2018/0203873 A1 Jul. 19, 2018

(51) Int. Cl.
*G06F 16/176* (2019.01)
*G06F 16/13* (2019.01)
(Continued)

(52) U.S. Cl.
CPC .......... *G06F 16/176* (2019.01); *G06F 3/0604* (2013.01); *G06F 3/067* (2013.01);
(Continued)

(58) Field of Classification Search
CPC ...... G06F 3/0608; G06F 3/0631; G06F 3/067; G06F 3/0685; G06F 16/1824;
(Continued)

(56) References Cited

U.S. PATENT DOCUMENTS

2006/0161753 A1    7/2006    Aschoff et al.
2010/0057990 A1    3/2010    Mizuno et al.
(Continued)

FOREIGN PATENT DOCUMENTS

JP    2008-527555 A    7/2008
JP    2010-055369 A    3/2010
(Continued)

OTHER PUBLICATIONS

International Search Report dated Apr. 26, 2016 of International Application No. PCT/JP2016/052383.

*Primary Examiner* — Shyue Jiunn Hwa
(74) *Attorney, Agent, or Firm* — Volpe and Koenig, P.C.

(57) ABSTRACT

The storage management computer according to the present invention can relatively easily configure a file sharing system for a file system. The storage management computer is provided with a calculation unit that includes at least a microprocessor and a communication interface circuit which communicates with a storage system, and the storage system is provided with a plurality of first pools for storing file data, and a plurality of second pools for storing block data corresponding to the file data. The calculation unit selects, from among the plurality of first pools, a predetermined first pool associated with one of the plurality of second pools, then selects a predetermined file system associated with the selected predetermined first pool, and configures a file sharing system for the selected predetermined file system.

11 Claims, 17 Drawing Sheets

(51) Int. Cl.
*G06F 16/182* (2019.01)
*G06F 16/185* (2019.01)
*G06F 3/06* (2006.01)

(52) U.S. Cl.
CPC ............ *G06F 3/0631* (2013.01); *G06F 16/13* (2019.01); *G06F 16/183* (2019.01); *G06F 16/185* (2019.01)

(58) Field of Classification Search
CPC ............ G06F 21/80; G06F 2221/2141; G06F 3/0605; G06F 3/061; G06F 3/0613; G06F 3/0622; G06F 3/0637; G06F 3/0643; G06F 3/0644; G06F 3/0647; G06F 3/065; G06F 3/0664; G06F 3/0665; G06F 3/0671; G06F 12/0246; G06F 3/0689; G06F 2212/7211; G06F 3/0641; G06F 12/12; G06F 3/0604; G06F 3/0652; G06F 3/0679; G06F 11/1008; G06F 11/108; G06F 11/1446; G06F 12/0802; G06F 12/0804; G06F 16/188; G06F 16/252; G06F 2003/0697; G06F 2201/815; G06F 2212/1016
See application file for complete search history.

(56) References Cited

U.S. PATENT DOCUMENTS

| | | | |
|---|---|---|---|
| 2011/0225379 | A1 | 9/2011 | Eguchi et al. |
| 2011/0282923 | A1 | 11/2011 | Maruyama et al. |
| 2012/0102201 | A1 | 4/2012 | Nakagawa et al. |
| 2012/0221611 | A1* | 8/2012 | Watanabe ............ G06F 3/0671 707/827 |
| 2014/0289562 | A1 | 9/2014 | Ozawa |
| 2014/0337577 | A1* | 11/2014 | Burton ................. G06F 3/0689 711/114 |
| 2016/0092467 | A1* | 3/2016 | Lee ....................... G06F 16/122 707/827 |
| 2016/0196079 | A1* | 7/2016 | Gong .................... G06F 3/0652 711/162 |

FOREIGN PATENT DOCUMENTS

| | | |
|---|---|---|
| JP | 2011-242826 A | 12/2011 |
| JP | 2013-535721 A | 9/2013 |
| JP | 2014-186383 A | 10/2014 |
| WO | 2011/074152 A1 | 6/2011 |
| WO | 2011/111093 A1 | 9/2011 |

* cited by examiner

Fig. 5

Storage pool management table T21

| Key | Name | Tiered Type | No. of Drive | Total Capacity | Used Capacity | Used % | DP Pool |
|---|---|---|---|---|---|---|---|
| Pool 1 | AB123 | Untiered | 8 | 320GB | 142GB | 44% | VP10 |
| Pool 2 | CD45 | Untiered | 6 | 80GB | 40GB | 50% | VP29 |
| Pool 3 | E678 | Tiered | 8 | 120GB | 17GB | 14% | VP43 |
| Pool 4 | FG90 | Untiered | 8 | 240GB | 74GB | 31% | VP09 |

Storage pool candidate table T11

| Key | Name | Tiered Type | No. of Drive | Total Capacity | Used Capacity | Used % | DP Pool | Assign 1:1 | Storage Profile |
|---|---|---|---|---|---|---|---|---|---|
| Pool 1 | AB123 | Untiered | 8 | 320GB | 142GB | 44% | VP10 | True | Gold |
| Pool 2 | CD45 | Untiered | 6 | 80GB | 40GB | 50% | VP29 | True | Gold |
| Pool 3 | E678 | Tiered | 8 | 120GB | 17GB | 14% | VP43 | False | - |
| Pool 4 | FG90 | Untiered | 8 | 240GB | 74GB | 31% | VP09 | True | Silver |

Fig. 6

Storage profile management table T12

| Key | C121 Name | C122 Pool Type | C123 Description | C124 Disk Type | C125 NO. of Pools | C126 Total Capacity | C127 Used Capacity | C128 Subscribed Capacity | C129 Used% | C12A Subscription |
|---|---|---|---|---|---|---|---|---|---|---|
| Prof1 | Bronze | DP | Bronze Rank | SATA | 14 | 932GB | 36GB | 4.20TB | 3% | 462% |
| Prof2 | Gold | DP | Gold Rank | SAS 15K | 25 | 388GB | 43GB | 2.80TB | 11% | 740% |
| Prof3 | Silver | DP | Silver Rank | SAS 10K | 36 | 7.84TB | 142GB | 1.08PB | 1% | 14101% |
| Prof4 | Ultimate | DP | Ultimate Rank | SSD, FMD | 0 | 0 | 0 | 0 | - | - |
| Prof5 | Dynamic | DT | Dynamic Rank | - | 13 | 673GB | 44GB | 5.46TB | 6% | 830% |
| Prof6 | Bronze-TI | TI | Bronze Rank (TI) | SATA | 5 | 19GB | 2.7GB | - | 13% | - |
| Prof7 | Silver-TI | TI | Silver Rank (TI) | SAS 10K | 11 | 77GB | 2.1GB | - | 2% | - |

Fig. 7

Service management table T13

| C130 | C131 | C132 | C133 | C134 | C135 | C136 | C137 | C138 | C139 | C13A |
|---|---|---|---|---|---|---|---|---|---|---|
| ID | Name | Server / Cluster | VS | File System | Storage Pool Type | Storage Profile | Permissions | Common Part of Path | CIFS Share Name | NFS Export Name |
| Srv1 | common | Server1 | Any | Any | Untiered | Bronze | Everyone/Deny/Allow | \common | project | project |
| Srv2 | Daily | Any | Any | Any | Untiered | Bronze | Admins/Deny/Allow | \common\daily | test | - |
| Srv3 | Monthly | Any | VS1 | Fs03 | Tiered | Silver | Admins/Deny/Allow | \silver | - | linux |
| Srv4 | Ultimate | cluster5 | Any | Any | Tiered | Gold | Admins/Deny/Allow | \gold | - | gold |
| ... | ... | ... | ... | ... | ... | ... | ... | ... | ... | ... |

Fig. 8

Task management table T14

| ID | C141<br>Service ID | C142<br>Name | C143<br>Status | C144<br>Start Time | C145<br>Completion Time | C146<br>Submitted By | C147<br>Storage Pool | C148<br>DvM Name |
|---|---|---|---|---|---|---|---|---|
| Task1 | Srv3 | task | Completed | 2015-05-05 14:00:00 | 2015-05-05 14:12:53 | Delta | Pool_cls4 | DC3 |
| Task2 | Srv1 | Test-task | Failed | 2015-07-01 08:30:28 | 2015-07-01 09:02:20 | Charlie | pl-20 | DC1 |
| Task3 | Srv1 | alpha | In Progress | 2015-10-25 15:41:06 | - | Admin | - | - |
| Task4 | Srv2 | beta | Canceled | 2015-12-13 10:55:19 | 2015-12-13 12:10:38 | Admin | - | - |
| ... | ... | ... | ... | ... | ... | ... | ... | ... |

Configuration screen (Admin user) — G11

Storage Classification — G111

Storage Pool Type: ○ Untiered  ● Tiered

Storage Profile: [ Gold ▼ ]

Resource Criteria — G112

🔒▼ Server / Cluster: [ Any Server / Cluster ▼ ]

Common part of Path: [ \prod ] — G113

G114 — ( OK )   ( Cancel ) — G115

(b)

Configuration screen (Submit user) — G12

Resource Criteria — G121

VS: [ VS1 ▼ ]

File System: [ Any File System ▼ ]

Path: \prod\ [ project A ] — G122

Share Name: [ project A ]

Export Name: [ project A ]

G123 — ( OK )   ( Cancel ) — G124

Fig. 10

Confirmation screen (Admin user) — G13

Access Path Information — G131

CIFS Share: \\vs003\project A

NFS Export: vs003 : project A

Permissions — G132

| User / Group | Type | Full Control | Change | Read |
|---|---|---|---|---|
| Everyone | Well-known Group | Denny | Denny | Allow |
| Admins | Unknown Group | Allow | Allow | Allow |

Detailed Provisioning Results — G133

| | |
|---|---|
| Server/Cluster | Cls3 |
| VS | VS2 |
| File System | Test-fs |
| Path | \fromdvm |
| Storage Pool | Pool_cls4_M1 |
| Dvm Name | Instance@DC1 |

G134 — [ OK ]

STORAGE MANAGEMENT COMPUTER, STORAGE MANAGEMENT METHOD, AND RECORDING MEDIUM

TECHNICAL FIELD

This invention relates to a storage management computer, a storage management method, and a recording medium.

BACKGROUND ART

As the virtualization and cloud formation develop, apparatuses for managing storage systems are required to have a function that is capable of executing provisioning without reminding the user of detailed settings. Users have always demanded such provisioning function for block storages (PTL 1). In recent years, however, the users have been demanding a performance-specific provisioning function.

CITATION LIST

Patent Literature

[PTL 1]
Japanese Translation of PCT Application No. 2008-527555

SUMMARY OF INVENTION

Technical Problem

PTL 1 describes determining performance characteristics of storages from workload parameters and executing, on a block storage, provisioning of a storage that satisfies a designated requirement.

Although PTL 1 describes the technique of executing provisioning on block storages, the technique cannot be applied to file systems. Such performance category as block storages does not exist in file systems in the first place. Thus, the user needs to manually evaluate the performance of a file system in order to realize performance-specific provisioning of file systems.

However, a storage system is larger in scale and complicated due to virtualization or cloud formation. The user therefore needs to manually specify block storages corresponding to the file systems in order to evaluate the file systems, which requires some high level of skill and experiences. For this reason, performing performance-specific provisioning on file systems is a cumbersome task for the user.

The present invention was contrived in view of the foregoing problems, and an object thereof is to provide a storage management computer capable of easily configuring a file sharing system for a file system, a storage management method, and a recording medium. Another object of the present invention is to provide a storage management computer capable of evaluating the performance of a first pool by using a performance index of a second pool and configuring a file sharing system based on the evaluation of the performance of the first pool, a storage management method, and a recording medium.

Solution to Problem

In order to solve the foregoing problems, the storage management computer according to the present invention is a storage management computer for managing a storage system, comprising a calculation unit that includes at least a microprocessor, and a communication interface circuit which communicates with the storage system, wherein the storage system has a plurality of first pools for storing file data, and a plurality of second pools for storing block data corresponding to the file data, and the calculation unit selects, from among the first pools, a predetermined first pool associated with one of the second pools, selects a predetermined file system associated with the predetermined first pool, and configures a file sharing system for the predetermined file system.

Advantageous Effects of Invention

The present invention can select a predetermined first pool corresponding to one of the second pools and configure a file sharing system for a predetermined file system associated with the selected predetermined first pool.

BRIEF DESCRIPTION OF DRAWINGS

FIG. 1 is an explanatory diagram showing an overview of a storage system, a management automation server, and the like.

FIG. 2 is a connection diagram showing the storage system, management automation server, and the like.

FIG. 4 is a composition diagram showing the management automation server, a management server, and the like.

FIG. 5 is a composition diagram showing a table for managing file storage pools.

FIG. 6 is a composition diagram showing a table for managing profiles of the file storage pools.

FIG. 7 is a composition diagram showing a table for managing services.

FIG. 8 is a composition diagram showing a table for managing tasks.

FIG. 9 is a screen example for configuring a file sharing system.

FIG. 10 is a screen example for confirming the configured file sharing system.

DESCRIPTION OF EMBODIMENTS

An embodiment of the present invention is now described hereinafter based on the drawings. As will be described hereinafter, the present embodiment uses the characteristics of block pools (second pools) as the characteristics of file storage pools (first pools) based on the correspondence relations between the file storage pools and the block pools. Accordingly, the present embodiment can realize a provisioning function in file systems based on the same performance evaluation performed on the block pools.

Figure 1:
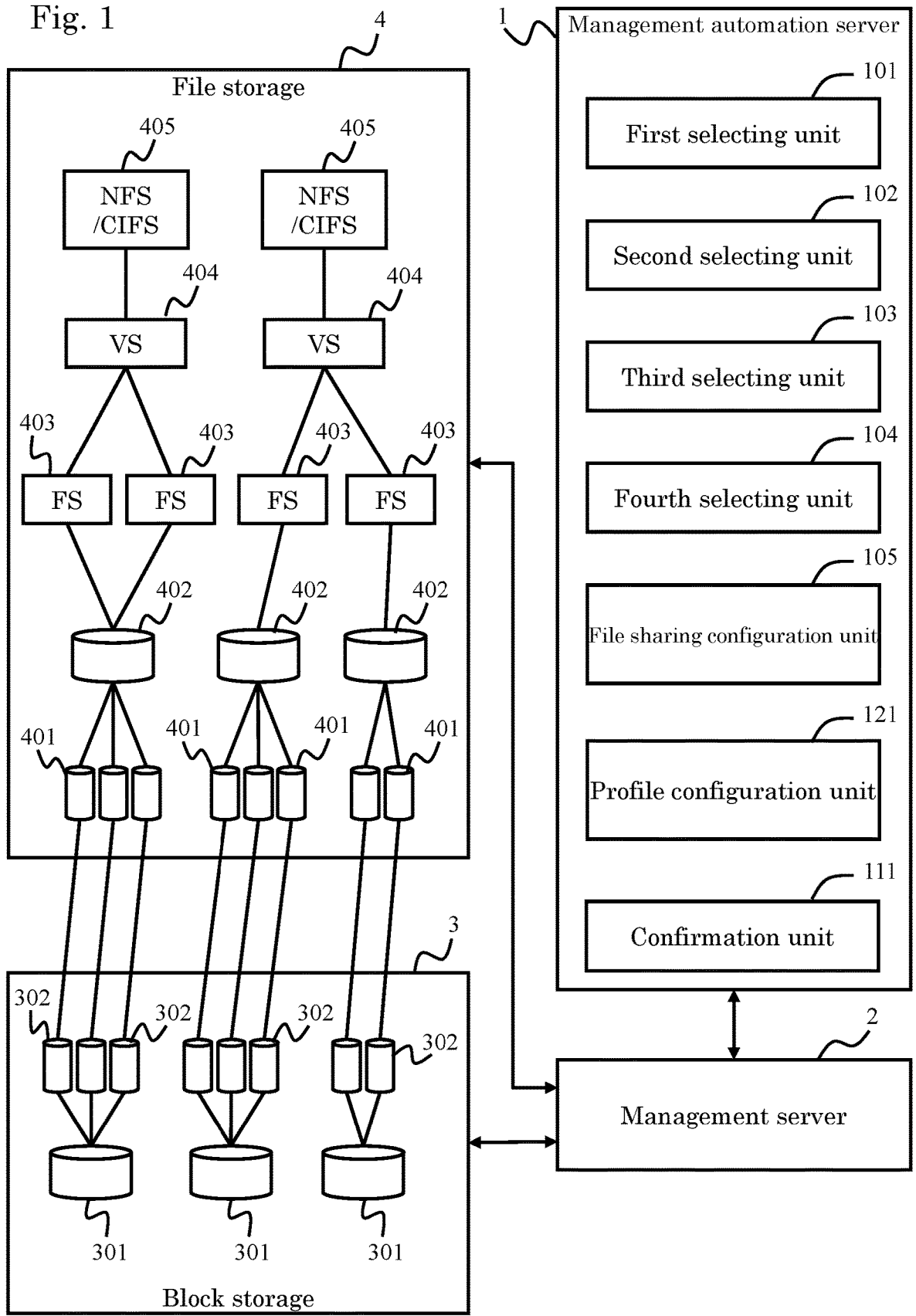

FIG. 1 is an overall block diagram showing an overview of a storage management computer and a storage system according to the present embodiment. Detailed composition examples are described hereinafter with reference to FIG. 2 and the subsequent drawings.

Figure 2:
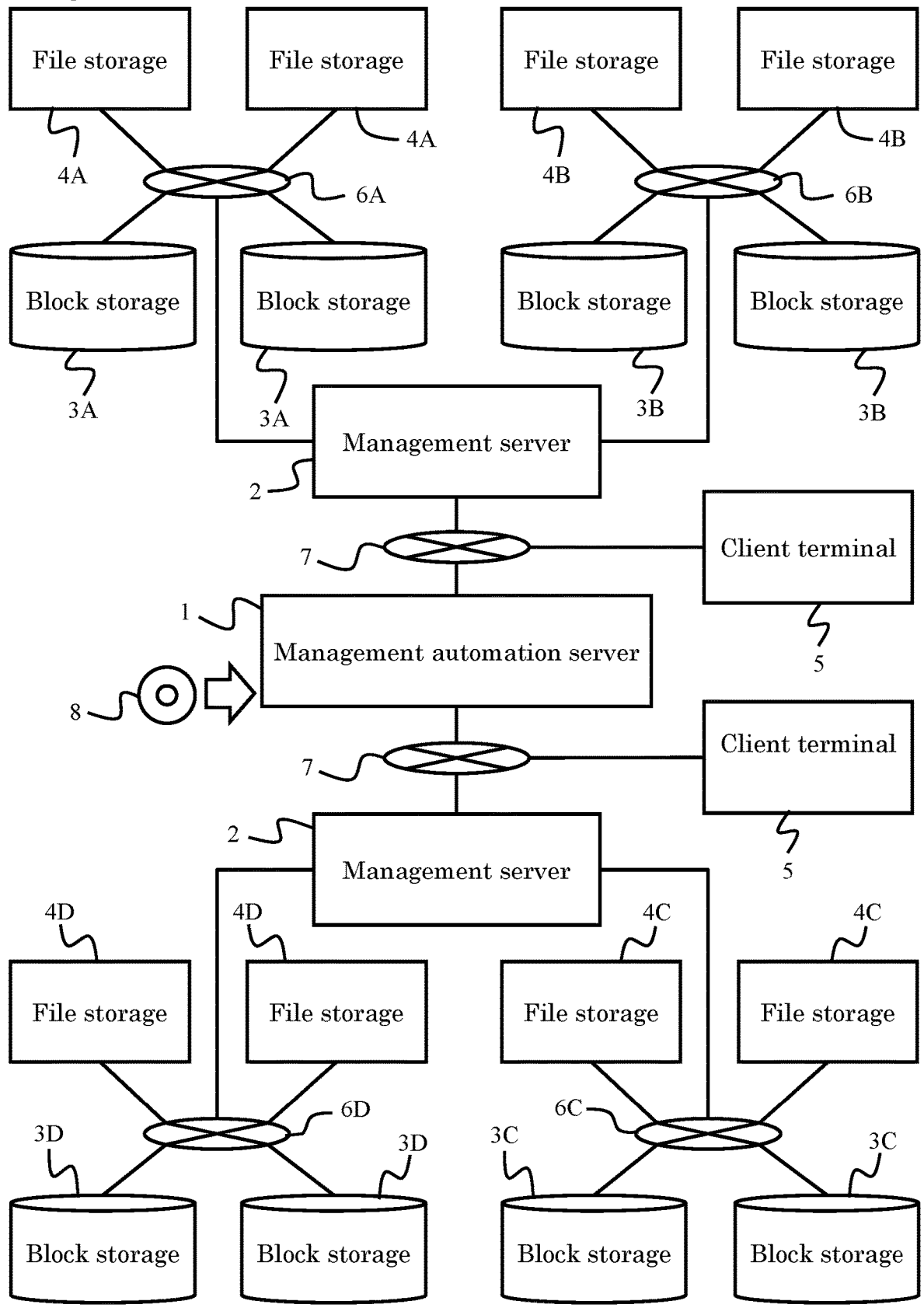

The storage system has a plurality of block storages 3 and a plurality of file storages 4 (see FIG. 2).

Each of the block storages 3 is an apparatus that saves block data to, for example, a physical storage apparatus such as a hard drive or a flash memory device in a readable/writable manner and constructed as, for example, a RAID (Redundant Arrays of Inexpensive Disks) system. The block storages 3 duplicate the storage areas of physical storage apparatuses by using RAID technology, to provide highly reliable storage areas to the file storages 4. The block storages 3 each have block pools 301 as the "second pools" and logical volumes 302 that are formed from the RAID storage areas of the block pools 301. Detailed composition examples are described with reference to FIG. 3.

Each of the file storages 4 is an apparatus that manages and saves file data in a readable/writable manner and constructed as, for example, a NAS (Network Attached Storage). The file storages 4 each have system drives 401, file storage pools 402 as the "first pools," file systems 403, virtual servers 404, and file sharing systems 405. Detailed composition examples are described with reference to FIG. 3. In the drawing, the file systems are often abbreviated as "FS," the virtual servers as "VS," and file sharing systems as "NFS/CIFS." The acronym NFS is short for Network File System. The acronym CIFS is short for Common Internet File System.

A management server 2, functioning as a "sub-management computer," manages the block storages 3 and the file storages 4. The management server 2 sends an instruction to the block storages 3 and file storages 4 based on an instruction from a management automation server 1. In addition, in response to a request from the management automation server 1, the management server 2 acquires information from the block storages 3 and file storages 4 and transmits the acquired information to the management automation server 1. Detailed composition examples of the management server 2 are described hereinafter with reference to FIG. 4.

The management automation server 1, functioning as a "storage management computer," manages the plurality of block storages 3 and the plurality of file storages 4 through the management servers 2. The management automation server 1 supports management tasks performed by a user (an administrator or the like of the storage system). Detailed composition examples of the management automation server 1 are described hereinafter with reference to FIG. 4.

Functions and compositions of the management automation server 1 are now described. The management automation server 1 has, for example, a first selecting unit 101, a second selecting unit 102, a third selecting unit 103, a fourth selecting unit 104, a file sharing configuration unit 105, a profile configuration unit 121, and a confirmation unit 111.

First, the user (Admin user) associates a file storage pool 402 one-on-one with a block pool 301 by using a file storage management program P20 and a block storage management program P21 of the management server 2. By associating a file storage pool 402 with only one of the block pools 301, the user can improve the performance of this file storage pool 402. Specifically, by associating all of the system drives 401 included in a file storage pool 402 only with logical volumes 302 generated from one block pool 301, the user can associate the file storage pool 402 one-on-one with the block pool 301. In a tiered pool with a plurality of tiers, the block pool 301 may be associated one-on-one with the file storage pool 402 by the tier.

The first selecting unit 101 is a function that extracts candidate file storage pools 402 from among the file storage pools 402 of the file storage 4. The user (Admit user or Submit user) extracts candidate file storage pools 402 by using the first selecting unit 101. The Admit user here means an administrator who manages the storage system. The Submit user means an operator who operates the storage system in response to an instruction from the Admit user.

The second selecting unit 102 is a function that selects, from among the extracted candidate file storage pools 402, a file storage pool 402 that has the same profile as a designated profile. Profile here corresponds to "value of figure of merit," meaning the performance of the file storage pool 402. As described hereinafter, profiles according to performances are configured for the file storage pools 402, such as "Ultimate," "platinum," "gold," "silver," and "bronze." The levels of the performance increase in the order of "Ultimate," "platinum," "gold," "silver," and "bronze". In addition, performance evaluation values such as "Ultimate," "platinum," "gold," "silver," and "bronze" are configured for the block pools 301. Namely, according to the present embodiment, by associating the block pool 301 one-on-one with the file storage pool 402, the profile configured for the block pool 301 can be used directly in the file storage pool 402. The user can designate a desired profile and select the file storage pool 402 having the desired profile by using the second selecting unit 102.

The second selecting unit 102 selects a candidate file storage pool 402 from among the file storage pools 402 available to the user. The second selecting unit 102 selects a pool 402 for which the user have operation authorization. The pools for which the user have operation authorization mean the pools that are permitted to be operated by the user.

In this manner, the second selecting unit 102 extracts, from among the file storage pools 402 that are extracted as the candidates by the first selecting unit 101, a file storage pool 402 that has the designated profile and is permitted to be operated by the user.

The third selecting unit 103 is a function that, in a case where multiple file storage pools 402 are extracted by the second selecting unit 102, selects one of the file storage pools 402. The third selecting unit 103 selects any one of the multiple file storage pools 402 by using, for example, the pool utilization and/or pool availability. For example, the third selecting unit 103 can select, from among the plurality of file storage pools 402, the one with a low pool utilization, the one with a low pool availability, or the one with a low pool utilization and a low pool availability.

The fourth selecting unit 104 selects one file system 403 or virtual server 404 from among the file systems 403 configured for the file storage pool 402 selected by the third selecting unit 103. For example, the fourth selecting unit 104 can select the file system 403 with the lowest load. The fourth selecting unit 104 can also select one virtual server 404 from among the virtual servers 404 corresponding to the file storage pool 402 selected by the third selecting unit 103. For example, the fourth selecting unit 104 can select the virtual server with the lowest load (the virtual server provided with the lowest number of file systems 403). In a case where the user designates a file system 403 or a virtual server 404 beforehand, the file system 403 or the virtual server 404 that is designated by the user is selected from among the file systems 403 or virtual servers 404 corresponding to the file storage pool 402 selected by the third selecting unit 103.

The file sharing configuration unit 105 configures a file sharing system 405 designated by the user, for the selected virtual server 404. In a case where only a file system 403 is selected, the file sharing configuration unit 105 selects a virtual server 404 provided in the selected file system 403, and configures the file sharing system 405 for this virtual server 404.

The user can confirm the progress of the automatic configuration performed on the file sharing system 405, by using the confirmation unit 111. An example of a screen provided to the user by the confirmation unit 111 is described hereinafter with reference to FIG. 10.

According to the present embodiment composed as described above, the profiles used in the block pools 301 can be applied directly to the file storage pools 402, thereby realizing provisioning of the file systems that focuses on the performances of the file storage pools 402.

According to the present embodiment, by allowing the user to associate the file storage pool 402 one-on-one with the block pool 301 in advance, the corresponding file system can be configured automatically or semi-automatically in view of the performance of the file storage pool 402. Therefore, efficiency of management tasks performed by the user can be improved. The user can manage even a large-scale, complex storage system that is virtualized and has a cloud formed therein, more easily than ever before.

Embodiment 1

Embodiment 1 is now described using FIGS. 2 to 17. FIG. 2 shows an overall construction that includes storage systems and a management computer for the storage systems. Each of the storage systems is composed of, for example, a plurality of sites, each being provided with a plurality of block storages 3 and a plurality of file storages 4. As shown in FIG. 2, the alphabets affixed to reference numerals are used for the purpose of distinguishing the sites from one another. In each of the sites, the file storages 4 and the block storages 3 are coupled by a network 6 within the site to enable two-way communication.

The management server 2 can be provided with respect to a plurality of sites. The management server 2 manages the block storages 3 and the file storages 4 of the plurality of sites under the management. The management server 2 may be provided for each of the sites instead.

The management automation server 1 is coupled to management servers 2 by management communication networks 7 so as to be able to perform two-way communication. The management automation server 1 is an apparatus supporting the management work of the user, and integrally manages a plurality of management servers 2.

The user accesses the management automation server 1 through a client terminal 5, and manages the storage systems through the management automation server 1. The user can not only directly access each of the management servers 2 through the client terminal 5 but also manage the storage systems through the management servers 2. For example, a user with a high level of skill can manage the storage systems through the management servers 2, whereas a user with a low level of skill manages the storage systems through the management automation server 1.

The management automation server 1 can be constructed as a computer program product. By causing a computer to read a recording medium 8 that has recorded therein a predetermined computer program for realizing functions of the management automation server 1, this computer can be operated as the management automation server 1. In place of the recording medium 8, the predetermined computer program can be installed to a computer through a communication medium such as the Internet. The management automation server 1 may be mounted on the same computer as the computer mounted with the management servers 2 or may be mounted on a different computer.

Figure 3:
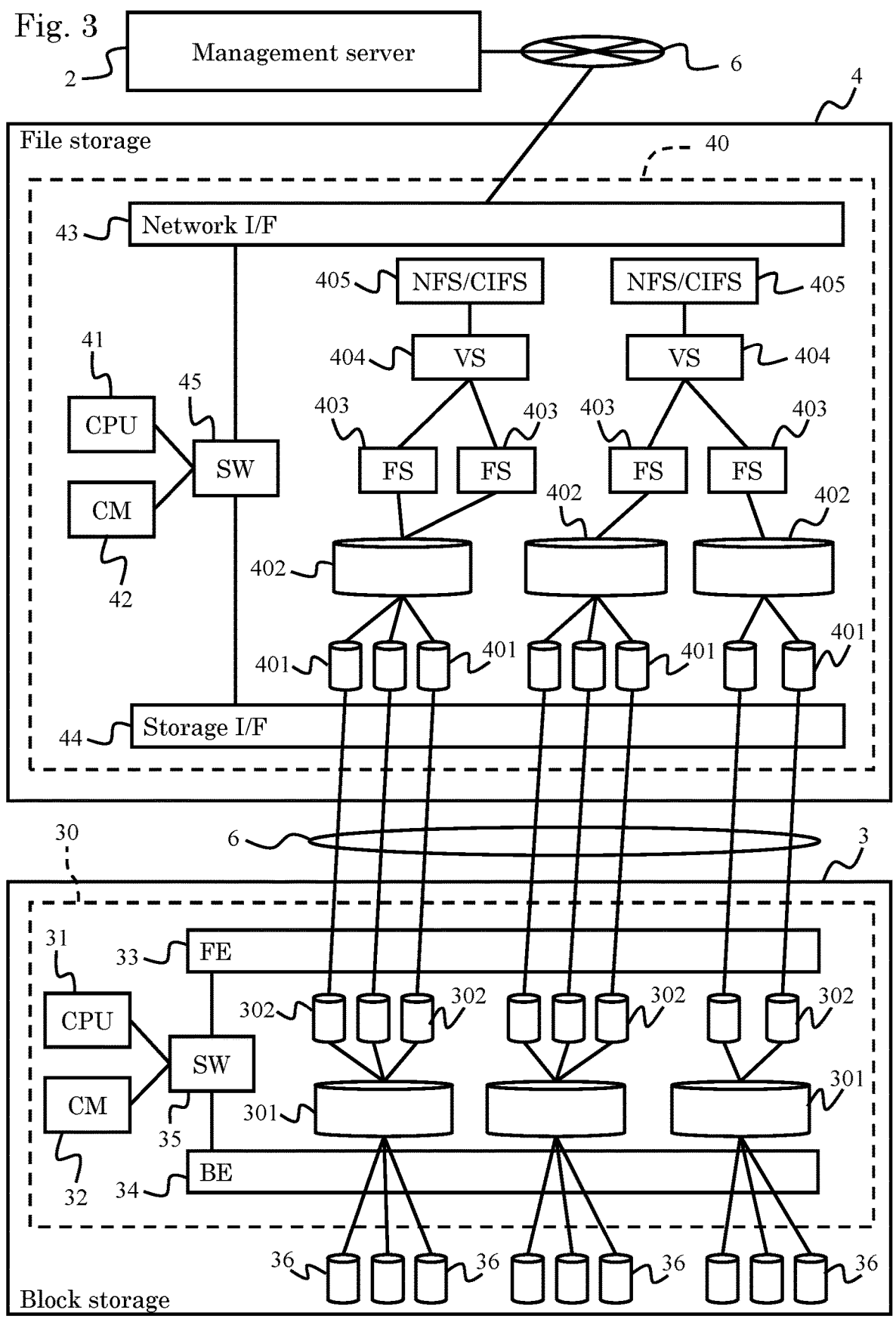
FIG. 3 is a composition diagram showing a file storage and a block storage.

FIG. 3 shows a composition of one of the block storages 3 and one of the file storages 4. The block storage 3 has, for example, a controller 30 and a plurality of physical storage apparatuses 36 controlled by the controller 30. A variety of storage apparatuses capable of reading and writing data, such as hard disk devices, semiconductor memory devices, optical disk devices, and magneto-optical disk devices can be used as the physical storage apparatuses 36. When using hard disk devices, for example, FC (Fibre Channel) disks, SCSI (Small Computer System Interface) disks, SATA disks, ATA (AT Attachment) disks, SAS (Serial Attached SCSI) disks or the like can be used. In addition, various storage apparatuses such as flash memory (SSD: Solid State Drive), MRAM (Magnetoresistive Random Access Memory), Phase-Change Memory, ReRAM (Resistive random-access memory), FeRAM (Ferroelectric Random Access Memory), and FMD (Flash Module Drive) can be used. Moreover, for example, different types of storage apparatuses may be mixed.

The controller 30 controls the operation of the block storage 3 and has, for example, a microprocessor 31, a memory 32, a front-end interface 33, a back-end interface 34, and a switch 35. The switch 35 couples these components 31 to 34 to one another.

The microprocessor 31 controls the operation of the controller 30 by reading and executing a computer program stored in the memory 32. In the drawing, the microprocessor is abbreviated as CPU, and the memory as CM. The memory 32 stores the computer program, management data and the like and provides workspaces to the microprocessor 31. The memory 32 also stores data read from the storage apparatuses 36 and stores data received from the file storage 4.

The front-end interface 33 is a communication circuit for communicating with the file storage 4. The back-end interface 34 is a communication circuit for communicating with each of the storage apparatuses 36.

The controller 30 generates the block pools 301 by virtualizing the physical storage areas of the physical storage apparatuses 36. The controller 30 then generates the logical volumes 302 of a fixed size or any size from the storage areas provided inside the block pools 301, and provides the generated logical volumes 302 to the file storage 4.

The file storage 4 has a controller 40. The controller 40 has, for example, a microprocessor 41, a memory 42, a network interface 43, a storage interface 44, and a switch 45. The switch 45 couples these components 41 to 44 to one another.

The microprocessor 41 realizes the function of the controller 40, i.e., the function of the file storage 4, by reading and executing a computer program stored in the memory 42. The memory 42 not only stores computer programs and management data, but also has a cache memory area.

The network interface 43 is a circuit for communicating with the management server 2 and the management automation server 1 (not shown in FIG. 3) through the communication network 6. The storage interface 44 is a circuit for communicating with the block storage 3 through the communication network 6.

The controller 40 generates and controls the system drives 401, file storage pools 402, file systems 403, virtual servers 404, and file sharing systems 405.

Each of the system drives 401 is a logical storage apparatus for storing file data (file system) and associated with one of the logical volumes 302 provided by the block storage 3.

Each of the file storage pools 402 includes at least one system drive 401. Each of the file systems 403 stores and manages the file data by using at least one of the system drives 401 managed by the file storage pool 402. Each of the virtual servers 404 manages the corresponding file sharing system 405 by using at least one file system 403.

Figure 4:
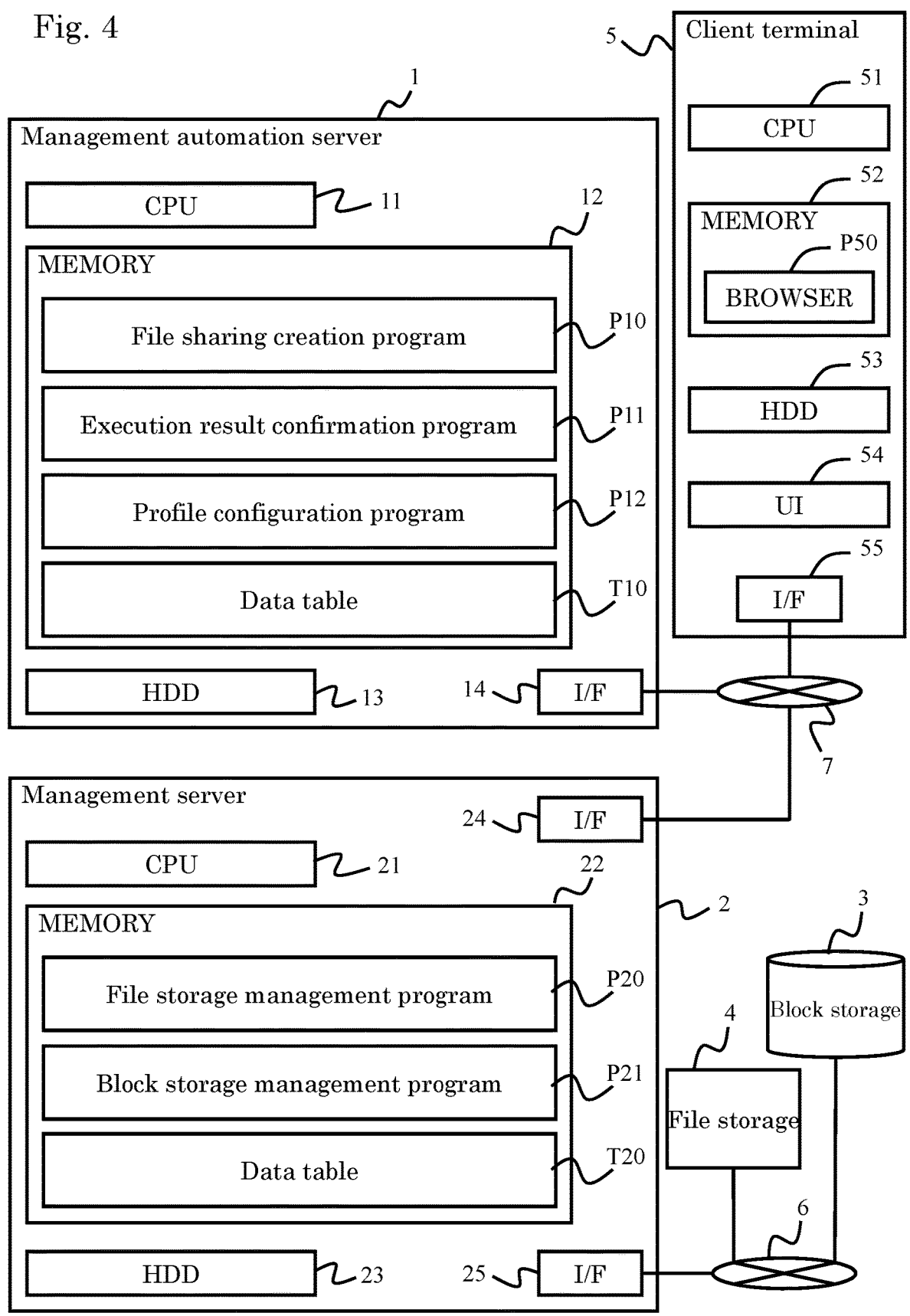

FIG. 4 shows an example of a composition for managing the storage system. The management automation server 1 has, for example, a microprocessor 11, a memory 12, an auxiliary storage apparatus 13, and a communication interface 14. Installation of the management automation server 1 and the management server 2 in separate computers is described herein.

The composition of "a calculation unit" includes, for example, at least the microprocessor 11, memory 12, and communication interface 13 provided in the management automation server 1. In case of integrating the management automation server 1 and the management server 2, the "calculation unit" can be composed of, for example, the microprocessors 11, 21, memories 12, 22, and communication interfaces 14, 24, 25.

The microprocessor 11 realizes the function of the management automation server 1 by reading and executing computer programs P10 to P12 stored in the memory 12. In executing the computer programs P10 to P12, the microprocessor 11 accordingly refers to a table T10 stored in the memory 12.

The auxiliary storage apparatus 23 is composed as a storage apparatus capable of reading and writing a relatively large volume of data, such as a hard drive or a flash memory device. In the drawing, the auxiliary storage apparatus is displayed as "HDD." The computer programs P10 to P12 and the data table T10 can be stored in the auxiliary storage apparatus 23. The microprocessor 11 transfers to the memory 12 the computer programs P10 to P12 and data table T10 stored in the auxiliary storage apparatus 23, to use these computer programs and data table.

The file sharing creation program P10 is a computer program for realizing a function of creating the file sharing systems (CIFS or NFS) 405 by taking into consideration the performances of the file storage pools 402. The execution result confirmation program P11 is a computer program for realizing a function of confirming the execution result (progress) of the file sharing creation program P10. The profile configuration program P12 is a computer program for defining a profile. The user can create, edit, and delete a profile by using the profile configuration program P12.

The communication interface 14 is a circuit for bidirectionally communicating with the management server 2 and client terminal 5 through the communication network 7.

The management server 2 has, for example, the microprocessor 21, the memory 22, an auxiliary storage apparatus 23, and the communication interfaces 24, 25.

The microprocessor 21 realizes the functions of the management server 2 by reading and executing the computer programs P20, P21 stored in the memory 22. In executing the computer programs P20, P21, the microprocessor 21 accordingly refers to a data table T20 stored in the memory 22.

The auxiliary storage apparatus 23 is composed as a storage apparatus capable of reading and writing a relatively large volume of data, such as a hard drive or a flash memory device. The computer programs P20, P21 and the data table T20 can be stored in the auxiliary storage apparatus 23. The microprocessor 21 transfers to the memory 22 the computer programs P20, P21 and data table T20 stored in the auxiliary storage apparatus 23, to use these computer programs and data table.

The communication interface 24 communicates bidirectionally with the management automation server 1 and client terminal 5 through the communication network 7. The other communication interface 25 communicates bidirectionally with the block storage 3 and file storage 4 through the communication network 6.

The client terminal 5 is a computer terminal that is used by the user for the purpose of operating the management automation server 1 or the management server 2. The client terminal 5 has, for example, a microprocessor 51, a memory 52, an auxiliary storage apparatus 53, a user interface unit 54, and a communication interface 55.

Computer programs stored in the auxiliary storage apparatus 53, such as web browsers, are transferred to the memory 52 at the startup of the client terminal 5 and read and executed by the microprocessor 51. By using a web browser P50, the user accesses a management screen provided by the management automation server 1 or management server 2 to display the information on the storage system or instruct a change in the composition of the storage system.

The user interface unit 54 is an apparatus for exchanging information with the user, and can include, for example, a display, a keyboard, a touch panel, a voice recognition apparatus, a voice synthesizing apparatus, and the like.

FIG. 5 shows tables for managing the compositions of the file storage pools 402. The management server 2 manages the compositions of the file storage pools 402 by using a storage pool management table T21. The storage pool management table T21 constitutes a part of the data table T20 shown in FIG. 4.

The storage pool management table T21 manages, for example, a key C210, a name C211, a tier type C212, the number of system drives C213, a total capacity C214, a used capacity C215, a utilization C216, and a block pool name C217 in such a manner as to associate these categories with one another. The storage pool management table T21 may include categories other than these categories C210 to C217. In addition, the storage pool management table T21 does not need to be composed as a table but may be composed by associating a plurality of tables. The fact that such a table may include categories other than the illustrated categories and may be composed from a plurality of tables, applies to the other tables described hereinafter.

The key C210 represents identification information for specifying target file storage pools 402. The name C211 represents the names of the target file storage pools 402. The tier type C212 represents information for identifying whether the target file storage pools 402 are tiered pools or not. In a case where the file storage pools 402 have a plurality of tiers, "Tiered" is configured as the tier type C212. In a case where the file storage pools 402 do not have tiers, "Untiered" is configured as the tier type C212.

The number of system drives C213 represents the number of system drives 401 included in the target file storage pools 402. The total capacity C214 represents storage capacities of the target file storage pools 402. The used capacity C215 represents the capacities of areas storing data, with respect to the total capacity C214. The utilization C216 represents the ratio of the used capacity C215 to the total capacity C214 (C216=C215/C214). The block pool name C217 represents information for specifying block pools 301 with which the target file storage pools 402 are associated. In the drawing, the block pools 301 are abbreviated as "DP Pool."

In configuring the file sharing systems 405, the management automation server 1 receives the foregoing storage pool management table T21 from the management server 2, and creates a storage pool candidate table T11 by adding unique information (C118, C119) to the information provided by this table T21. The storage pool candidate table T11 constitutes a part of the data table T10 shown in FIG. 4.

The storage pool candidate table T11 manages, for example, a key C110, a name C111, a tier type C112, the number of system drives C113, a total capacity C114, a used capacity C115, a utilization C116, a block pool name C117, a correlation C118, and a storage profile C119 in such a manner as to associate these categories with one another.

Of these categories C110 to C119, the categories c110 to C117 are the same as the abovementioned categories C210 to C217; therefore, descriptions thereof are omitted accordingly. The categories C118, C119 are added uniquely by the management automation server 1.

The correlation C118 represents information indicating the correlations between the target file storage pools 402 and the block pools 301 allocated to the target file storage pools 402. If the file storage pools 402 and the block pools 301 are associated one-on-one with each other, "True" is configured as the correlation C118, and if not, "False" is configured.

The storage profile C119 represents values of the profiles of the file storage pools 402. In the present embodiment, the pool performances are divided into a plurality of ranks such as "gold," "silver," and "bronze." In this example, the performance levels increase in the following order: gold>silver>bronze.

The profiles of the file storage pools 402 are defined based on the profiles of the allocated block pools 301. In a case where the file storage pools 402 and block pools 301 are associated one-on-one with each other, the profiles of the block pools 301 can be applied directly to the file storage pools 402. This is because it is acceptable to treat the performances of the file storage pools 402 corresponding only to one block pool 301 as almost the same as the profile of this block pool 301. In the following description, the term "storage profiles" is often abbreviated as "profiles."

FIG. 6 shows an example of a table T12 for managing the storage profiles. The management automation server 1 retains the storage profile management table T12 shown in FIG. 6 as a part of the data table T10. By retaining the storage profile management table T12, the management automation server 1 is able to know the pool resources that are provided within the storage system that is under the management.

The storage profile management table T12 manages, for example, a key C120, a name C121, a pool type C122, a description C123, a disk type C124, the number of pools C125, a total capacity C126, a used capacity C127, a subscribed capacity C128, a utilization C129, and a subscription C12A in such a manner as to associate these categories with one another.

The key C120 represents information for identifying the profiles. The name C121 represents the names of target profiles. The pool type C122 represents the types of pools. Examples of the types of pools include dynamic pools (DP: Dynamic Pool), dynamic tiered pools (DT: Dynamic Tiering), and snapshot creation pools (TI: Thin Image). The description C123 represents simple descriptions of the target profiles. The disk type C124 represents the types of the storage apparatuses 36 constituting the target pools. The number of pools C125 represents the total number of pools having the target profiles. The total capacity C126 represents the total capacities of the pools having the target profiles. The used capacity C127 represents the capacities being used out of the total capacities of the pools having the target profiles. The subscribed capacity C128 represents the capacities provided to the outside by the pools. The storage system can pretend to have a capacity larger than the actual capacity C126. The utilization C129 represents the ratio of the used capacity C127 to the total capacity C126 (C129=C127/C126). The subscription C12A represents the ratio of the actual capacity C126 to the pseudo capacity C128 (C12A=C126/C128).

FIG. 7 is an example of a table T13 for managing services. The management automation server 1 retains the service management table T13 as a part of the data table T10.

The service management table T13 manages, for example, an identifier C130, a name C131, a server/cluster discrimination C132, a virtual server name C133, a file system name C134, a storage pool type C135, a storage profile C136, an access permission C137, a common part of path C138, a CIFS share name C139, and a NFS export name C13A in such a manner as to associate these categories with one another.

The identifier C130 represents information for identifying services issued by the management automation server 1. The name C131 represents the names of the services. The server/cluster discrimination C132 represents configuration destination physical servers or clusters of the file sharing systems 405.

The virtual server name C133 specifies the virtual servers 404 provided with the file sharing systems 405. The file system name C134 specifies the file systems 403 provided with the file sharing systems 405. The storage pool type C135 identifies whether the file storage pools 402 are tiered pools or not. The storage profile C136 indicates the profiles of the file storage pools 402. The access permission C137 represents access authorization to the file storage pools 402.

The common part of path C138 represents parts designated by the user beforehand out of the paths for configuring the file sharing systems 405. The CIFS share name C139 represents information used when mounting CIFS as the file sharing systems 405. The NFS export name C13A represents information used when mounting NFS as the file sharing systems 405.

A part of the service management table T13 (the server/cluster discrimination C132, virtual server name C133, file system name C134, storage pool type C135, storage profile C136, common part of path C138, CIFS share name C139, NFS export name C13A) is reflected in a confirmation screen G13 that is described hereinafter with reference to FIG. 10.

FIG. 8 is an example of a table T14 for managing tasks of the services. The management automation server 1 retains the task management table T14 as a part of the data table T10.

The task management table T14 manages, for example, an identifier C140, a service identifier C141, a name C142, a status C143, a start time point C144, a completion time point C145, a task executor C146, a storage pool name C147, and a management server name C148 in such a manner as to associate these categories with one another.

The identifier C140 represents information for identifying tasks. The service identifier C141 represents information for identifying services corresponding to target tasks. The name C142 represents task names. The status C143 represents the statuses of the tasks, i.e., the progresses. The statuses include, for example, "completed," "failed," "in process," and "canceled." The start time point C144 represents the time points at which the tasks are executed. The completion time point C145 represents the time points at which the tasks are completed. The task executor C146 represents the executors of the tasks. The storage pool name C147 represents the names specifying the file storage pools 402. The management server name C148 specifies the management server 2 that manages the file storage pools 402 in which the services are implemented.

When the user clicks on the identifier C140 of the task management table T14 displayed on the screen of the user interface unit 54, the confirmation screen shown in FIG. 10 is displayed. At this moment, a part of the task management table T14 (the storage pool name C147, the management server name C148) is reflected in the confirmation screen G13.

FIG. 9 shows an example of a configuration screen that is provided by the management automation server 1 to the user interface unit 54 of the client terminal 5. In an attempt to configure the file sharing systems 405 within the storage system, the user uses a screen G11 shown in FIG. 9(a) or a screen G12 shown in FIG. 9(b).

FIG. 9(a) shows the configuration screen G11 that is used to associate a block pool 301 with a file storage pool 402. Prior to automatically configuring the file sharing systems 405, the user (e.g., Admin user) associates the block pool 301 one-on-one with the file storage pool 402 in advance so that the profile of the block pool 301 can be used.

At the stage of preparing for the automatic configuration of the file sharing systems 405, the user calls up the screen G11 and enters necessary information thereon. The screen G11 has, for example, a storage classification section G111, a resource selection section G112, a path configuration section G113, an OK button G114, and a cancel button G115.

The storage classification section G111 is an area for the user to designate the pool types and profiles of the file storage pools 402. As described above, the pool types include the tiered type and untiered type. The storage profiles include "gold," "silver," "bronze," and the like.

The resource selection section G112 is an area where the configuration destination servers or clusters of the file sharing systems 405 are selected. The path configuration section G113 is an area where a common part of path is designated in order to configure the file sharing systems 405. When satisfied with the content entered on the screen G11, the user operates the OK button G114. When canceling the configuration, the user operates the cancel button G115.

FIG. 9(b) shows an example of the screen G12 for automatically configuring the file sharing systems 405 within the storage system. In order to configure the file sharing systems 405, the user (e.g., Submit user) enters necessary information onto the screen G12 and then operates an OK button (execution button) G123.

The file sharing system configuration screen G12 has, for example, a resource selection section G121, a path configuration section G122, the OK button G123, and a cancel button G124.

The resource selection section G121 is an area for designating, for example, the virtual servers 404, which are the configuration destinations of the file sharing systems 405, and the file systems used by the virtual servers 404.

The path configuration section G122 is an area for configuring path names for configuring the file sharing systems 405. In the path configuration section G122, the paths configured in the path configuration section G113 shown in FIG. 9(a) are already configured.

When executing creation of the file sharing system 405 with the content entered son the screen G12, the user operates the OK button G123, and when canceling the configured content, the user operates the cancel button G124.

FIG. 10 shows the screen G13 for confirming the configuration state of the file sharing systems 405. The confirmation screen G13 has, for example, an access path information G131, an access permission information G132, a provisioning execution result G133, and an OK button G134.

The access path information G131 is an area that displays the paths for accessing the configured file sharing systems 405. The access authorization G132 is an area that displays authority over file sharing. The provisioning execution result G133 is an area that displays, for example, information on a certain file system or the like of a certain pool for which the file sharing systems 405 are configured. The user can end the screen G13 by operating the OK button G134.

A process of automatically configuring the file sharing systems 405 is described using FIGS. 11 to 17. Let it be assumed that, prior to executing this process, the user (e.g., Admin user) associates at least one file storage pool 402 with the block pool 301 on a one-on-one basis by using the file storage management program P20 and block storage management program P21 of the management server 2.

In so doing, associating the file storage pool 402 one-on-one with the block pool 301 can improve the performance of the file storage pool 402. Therefore, in order to execute a high-performance work process, the user allocates the block pool 301 to the file storage pool 402 on a one-on-one basis in advance. Such a method of creating a high-performance file storage pool 402 can be described in, for example, an instruction manual that is provided to the user by the management automation server 1.

Figure 11:
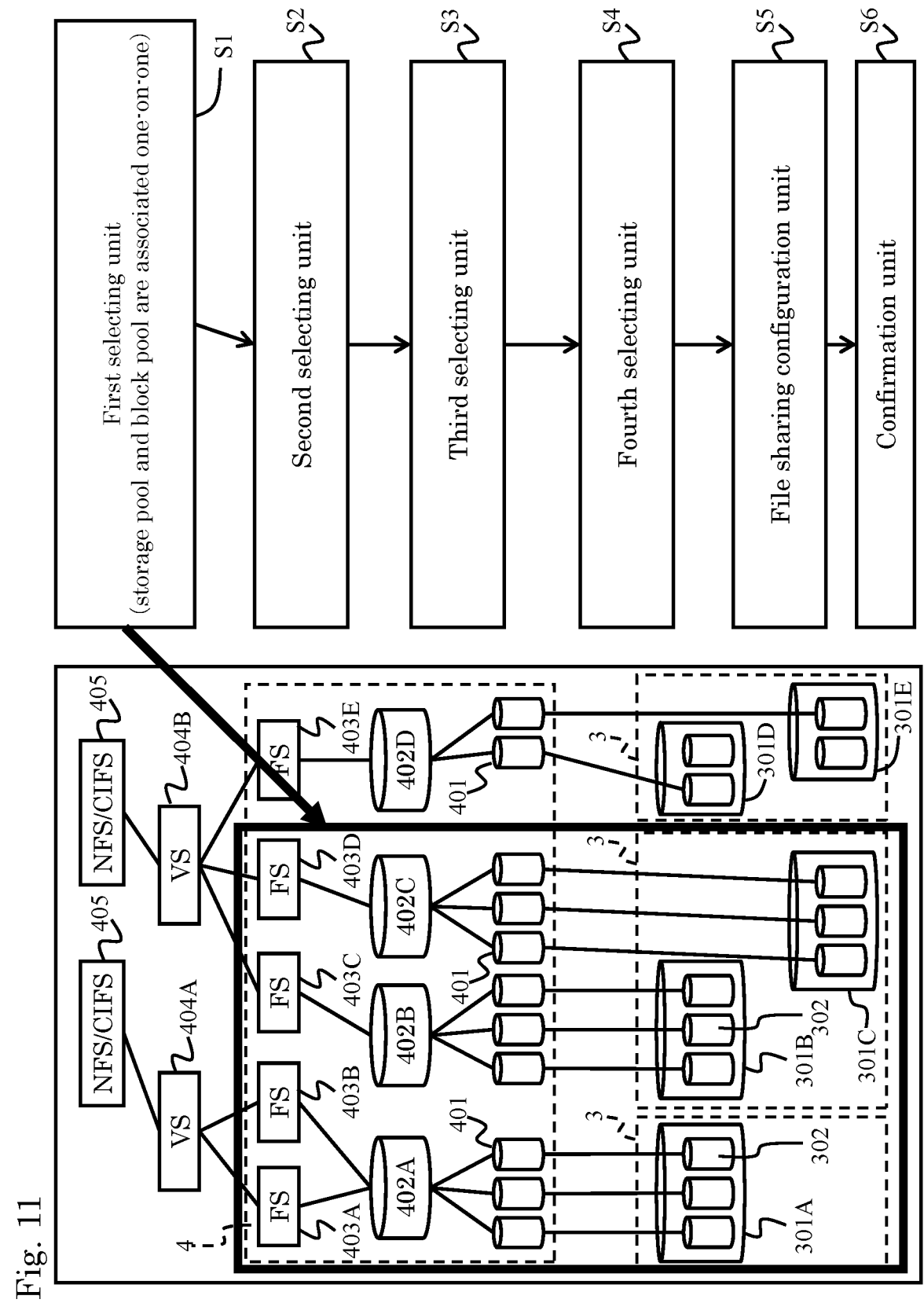
FIG. 11 is an explanatory diagram showing the steps of extracting a file storage pool associated one-on-one with a block pool.

FIG. 11 shows a process performed the first selecting unit 101. The first selecting unit 101 extracts, out of the file storage pools 402 of the storage system, file storage pools 402 associated one-on-one with any block pools 301 of the storage system, as candidate pools (S1).

Schematic diagrams of storage compositions are shown on the left-hand side of FIG. 11 and FIGS. 13 to 16 for the purpose of explaining an overview of each process. These storage compositions and the contents of the tables shown in FIGS. 5 to 8 or the content on the screen shown in FIG. 9 are not directly related. The drawings that are referred to in order to explain the processes (FIG. 11, FIGS. 13 to 16), the tables (FIGS. 5 to 8), and the screens (FIGS. 9, 10) are independent. Inconsistency in the contents of these drawings does not have any impact on understanding and implementing the present invention.

The first selecting unit 101 extracts a range where file storage pools 402 are associated one-on-one with block pools 301, as a candidate for a range where the file sharing systems 405 can be configured.

According to this process by the first selecting unit 101, the pool profiles used in the block pools 301 can be used for the file storage pools 402 to which only the block pools 301 are allocated. As a result, in the present embodiment, by using the performance evaluation (profiles) of the block pools 301 as is, not only is it possible to evaluate the performances of the file storage pools 402, but also provisioning of the file sharing systems 405 can be executed in consideration of the pool performances.

Figure 12:
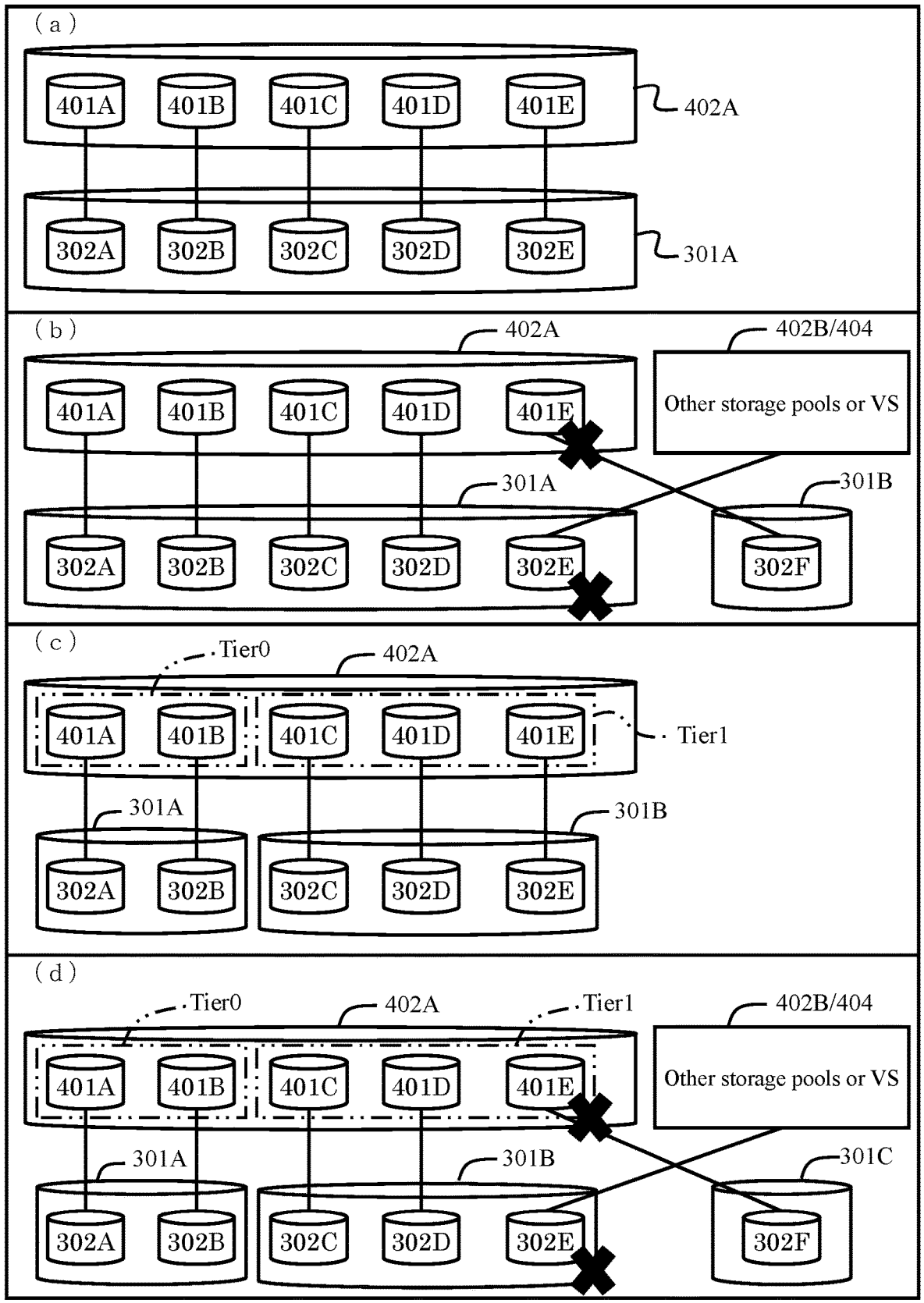
FIG. 12 is an explanatory diagram showing an example of association between a block pool and a file storage pool.

FIG. 12 shows an example in which the file storage pool 402 is associated one-on-one with the block pool 301. FIGS. 12(a), 12(b) each show an untiered file storage pool 402. FIGS. 12(c), 12(d) each show a tiered file storage pool 402. FIG. 12(a) and FIG. 12(b) are related to each other, and FIG. 12(c) and FIG. 12(d) are related to each other, but FIGS. 12(a) and 12(b) are not directly related to FIGS. 12(c) and 12(d); thus, the compositions thereof are different from each other.

As shown in FIG. 12(a), a file storage pool satisfying the following conditions CU1 to CU3 is extracted as a candidate pool for the untiered file storage pool 402.

(Condition CU1) The file storage pool 402 is of an untiered type.

(Condition CU2) All of the system drives 401 constituting this file storage pool 402 are associated with logical volumes 302 generated from one block pool 301.

(Condition CU3) The block pool 301 allocated to this file storage pool 402 does not have logical volumes 302 allocated to the other file storage pools or virtual servers 404.

In FIG. 12(a), a file storage pool 402A does not have a tier and therefore satisfies the condition CU1. Furthermore, all system drives 401A to 401E constituting the file storage pool 402A correspond to logical volumes 302A to 302E generated from one block pool 301A. In other words, the system drives 401A to 401E are composed of the logical volumes 302A to 302E generated from the one block pool 301A. Thus, the file storage pool 402A shown in FIG. 12(a) satisfies the condition CU2. In addition, because the block pool 301A does not have logical volumes that are allocated to the other file storage pools 402 or other virtual servers 404, the condition CU3 is satisfied. As a result, the file storage pool 402A shown in FIG. 12(a) is extracted as a candidate for the untiered file storage pool.

On the other hand, the file storage pool 402A shown in FIG. 12(b) does not have a tier and therefore satisfies the condition CU1.

However, of the system drives 401A to 401E, the single system drive 401E is allocated to a logical volume 302F provided within another block pool 301B and therefore does not satisfy the condition CU2. This is because using the profile of the block pool 301A directly as the profile of the file storage pool 402A increases errors, resulting in not being able to properly evaluate the performance of the file storage pool 402A.

The file storage pool 402A shown in FIG. 12(b) is allocated to the logical volume 302E corresponding to another file storage pool 402B or virtual server 404 within the corresponding block pool 301A, and therefore does not satisfy the condition CU3 either. Another virtual server 404 here means a virtual server other than the virtual servers 404 (not shown in FIG. 12) configured in the file storage pool 402A. In a case where the logical volume 302E allocated to the file storage pool 402B or virtual server 404 is present in the block pool 301A, there is a possibility that the response performances of the other logical volumes 302A to 302D become low due to the load of this logical volume 302E. Therefore, in this case as well, using the profile of the block pool 301A directly as the profile of the file storage pool 402A can increase errors, resulting in not being able to properly evaluate the performance of the file storage pool 402A. Consequently, the file storage pool 402A shown in FIG. 12(b) is not extracted as a candidate for the untiered file storage pool 402.

The tiered file storage pool 402 is now described. As shown in FIG. 12(c), a tiered file storage pool satisfying the following conditions CT1 to CT3 is extracted as a candidate for the tiered file storage pool 402.

(Condition CT1) The file storage pool 402 is of a tiered type.

(Condition CT2) The system drives 401 consisting this file storage pool 402 correspond to logical volumes 302 generated from block pools 301, the number of which matches the number of tiers.

(Condition CT3) Logical volumes 302 allocated to another file storage pool or virtual server 404 are not present in the block pools 301 allocated to this file storage pool 402.

Two tiers, tier 0 and tier 1, are formed in the files storage pool 402A shown in FIG. 12(c). The tier 0 is composed of the system drives 401A, 401B of the block pool 301A, and the tier 1 is composed of the system drives 401C to 401E of the block pool 301B. Therefore, since the file storage pool 402A shown in FIG. 12(c) satisfies all of the conditions CT1 to CT3, the file storage pool 402A is extracted as a candidate pool for the tiered file storage pool 402. In a case where each of the tiers 0, 1 is likened to a single file storage pool, such file storage pool can be determined based on the conditions CU1 to CU3 concerning the untiered pool.

The file storage pool 402A shown in FIG. 12(d) satisfies the condition CT1 but does not satisfy the other conditions CT2, CT3. For this reason, the file storage pool 402A shown in FIG. 12(d) is not extracted as a candidate for the tiered file storage pool 402.

FIG. 11 is referred to again. In the composition example shown on the left-hand side of FIG. 11, the first selecting unit 101 extracts three file storage pools 402A to 402C as the candidate pools. A file storage pool 402D has a plurality of block pools 301D, 301E allocated thereto, and therefore does not satisfy the condition CU2. For this reason, the file storage pool 402D is not extracted as a candidate pool.

Figure 13:
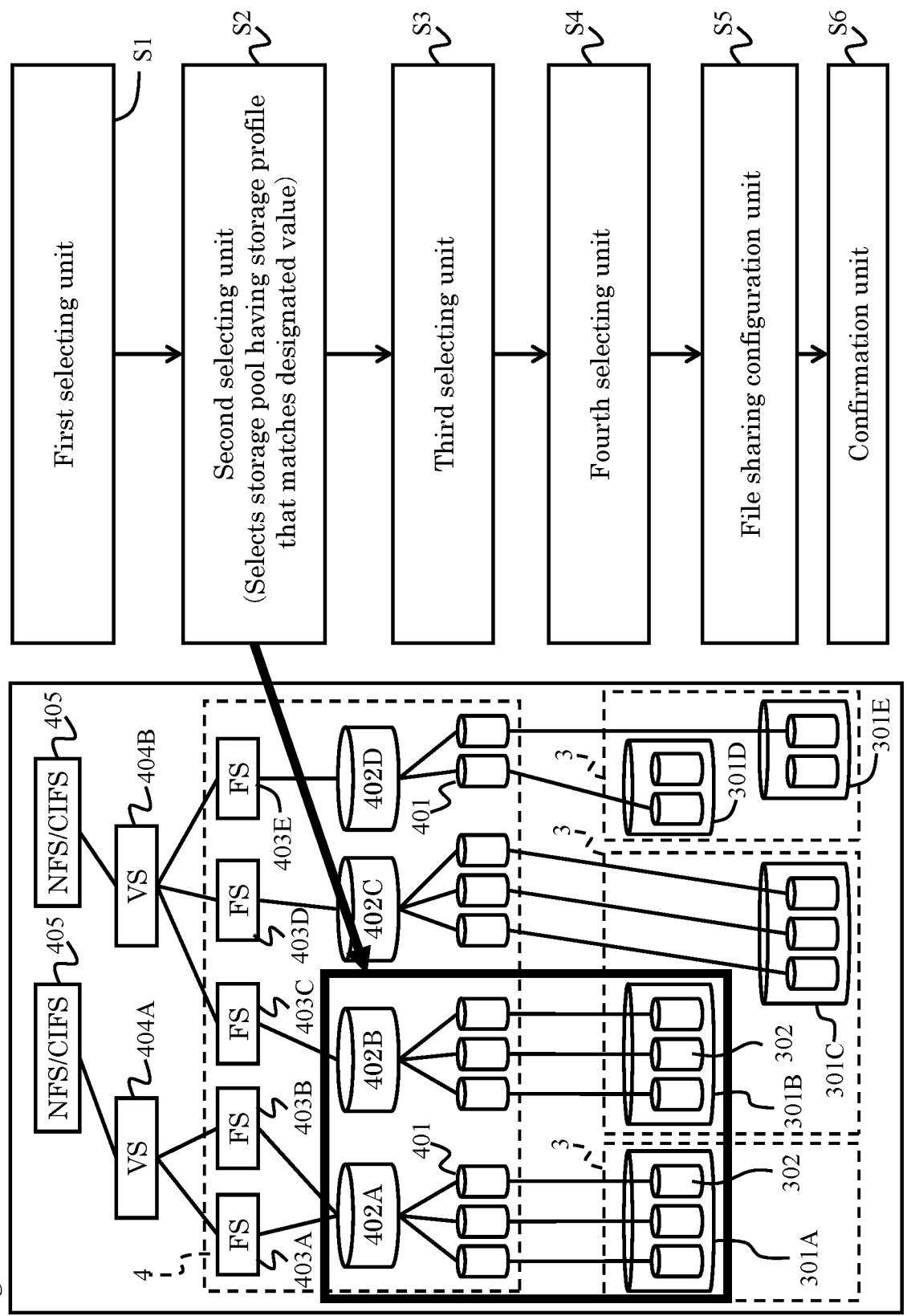
FIG. 13 is an explanatory diagram showing the steps of selecting a file storage profile based on the profiles.

FIG. 13 shows a process (S2) executed by the second selecting unit 102. The second selecting unit 102 selects, from among the candidate pools 402 extracted by the first selecting unit 101, one or more pools 402 that are permitted to be operated by the user and have designated storage profiles.

As described above, the first selecting unit 101 selects the three file storage pools 402A to 402C. Block pools 301A to 301C are allocated to the file storage pools 402A to 402C on a one-on-one basis. Let it be assumed that the block pools 301A, 301B share the same profile, "gold," that the profile of the block pool 301C is "silver," and that "gold" is designated as the profile that the configuration destination pools of the file sharing systems 405 should have.

In the foregoing example, because the profile of the block pool 301C does not match the designated value (gold), the second selecting unit 102 does not select the file storage pool 402C to which the block pool 301C is allocated.

The second selecting unit 102 selects, from among the candidate pools 402A to 402C extracted by the first selecting unit 101, only the file storage pools 402A, 402B that are permitted to be operated by the user.

Figure 14:
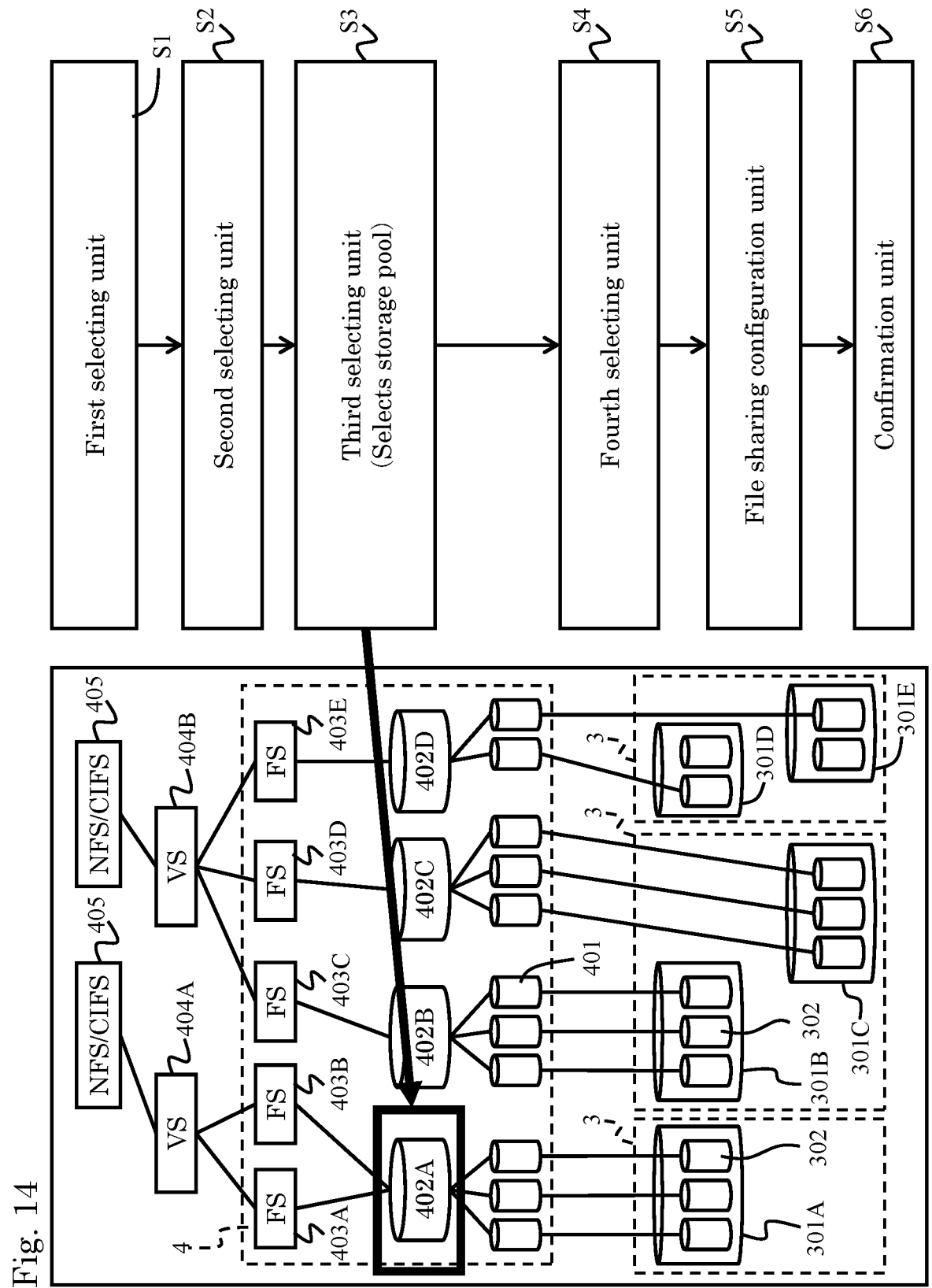
FIG. 14 is an explanatory diagram showing the steps of selecting a file storage pool based on at least either a pool utilization or pool availability.

FIG. 14 shows a process (S3) performed by the third selecting unit 103. The third selecting unit 103 selects one file storage pool 402 from among the plurality of file storage pools 402 selected by the second selecting unit 102.

The third selecting unit 103 selects one file storage pool 402 based on, for example, either the pool utilization or the pool availability. For example, the third selecting unit 103 selects a file storage pool 402 corresponding to a block pool 301 having a low pool utilization. The third selecting unit 103 can also select a file storage pool 402 corresponding to a block pool 301 having a low pool availability. Furthermore, the third selecting unit 103 can select a block pool 301 in comprehensive consideration of the two criteria, the pool utilization and the pool availability, and then select one file storage pool 402 corresponding to this block pool 301. Note that criteria other than the pool utilization and pool availability may be employed. In the example shown in FIG. 14, the third selecting unit 103 selects the file storage pool 402A.

Figure 15:
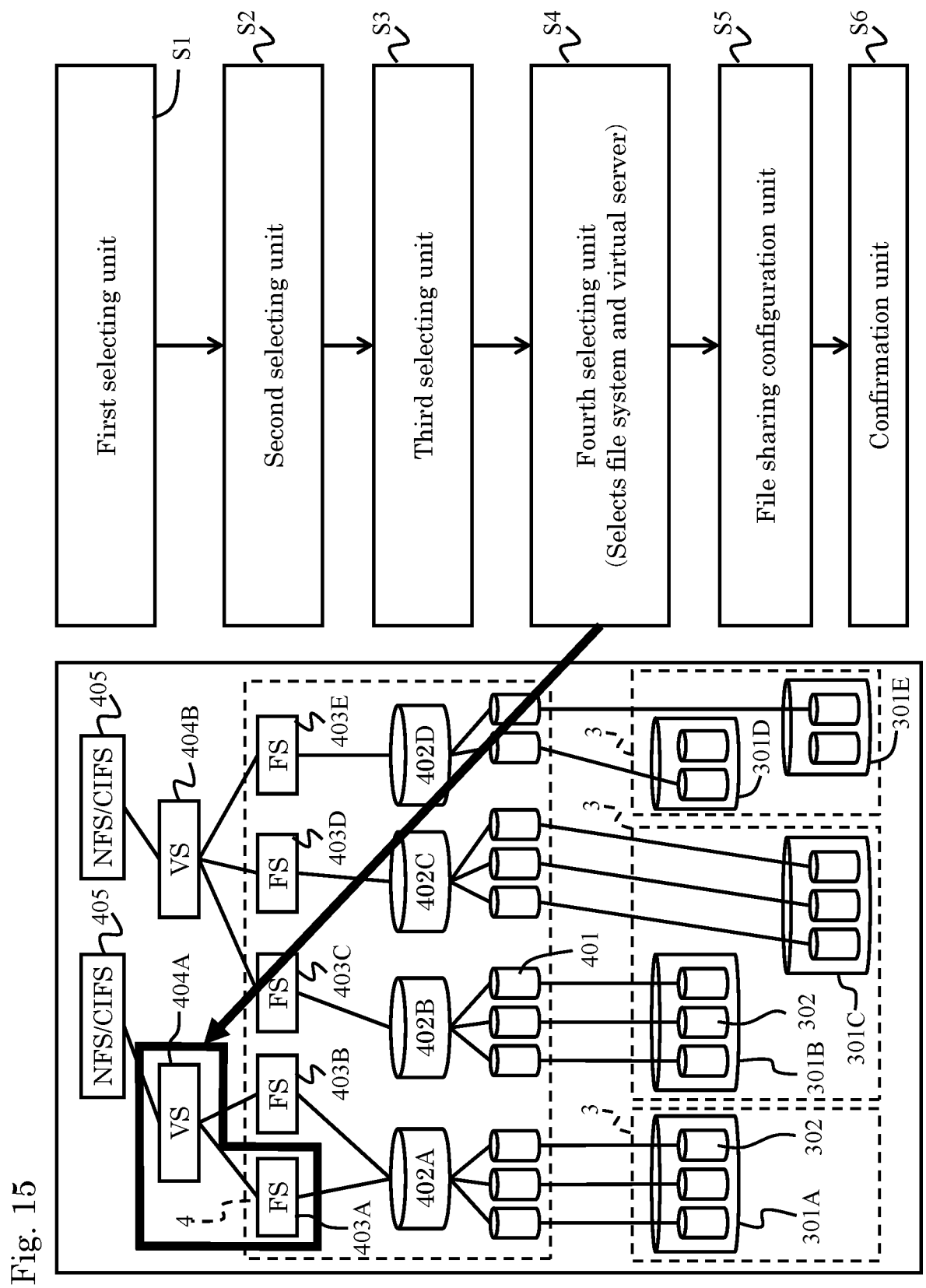
FIG. 15 is an explanatory diagram showing the steps of selecting a file system and a virtual server.

FIG. 15 shows a process (S4) performed by the fourth selecting unit 104. The fourth selecting unit 104 selects one file system (virtual server) configuring a file sharing system 405, from among the file systems 403 and virtual servers 404 configured for the selected file storage pool 402. When selecting a file system 403, the file sharing system 405 is configured for the virtual server 404 that uses this file system 403.

In a case where a file system or a virtual server is designated by the user in order to automatically configure the file sharing system 405, the fourth selecting unit 104 selects the file system or virtual server designated by the user. In a case where any file system or virtual server is not designated by the user, the fourth selecting unit 104 may select, for example, a virtual server with a low load. FIG. 15 shows that a virtual server 404A that uses a file system 403A is selected.

Figure 16:
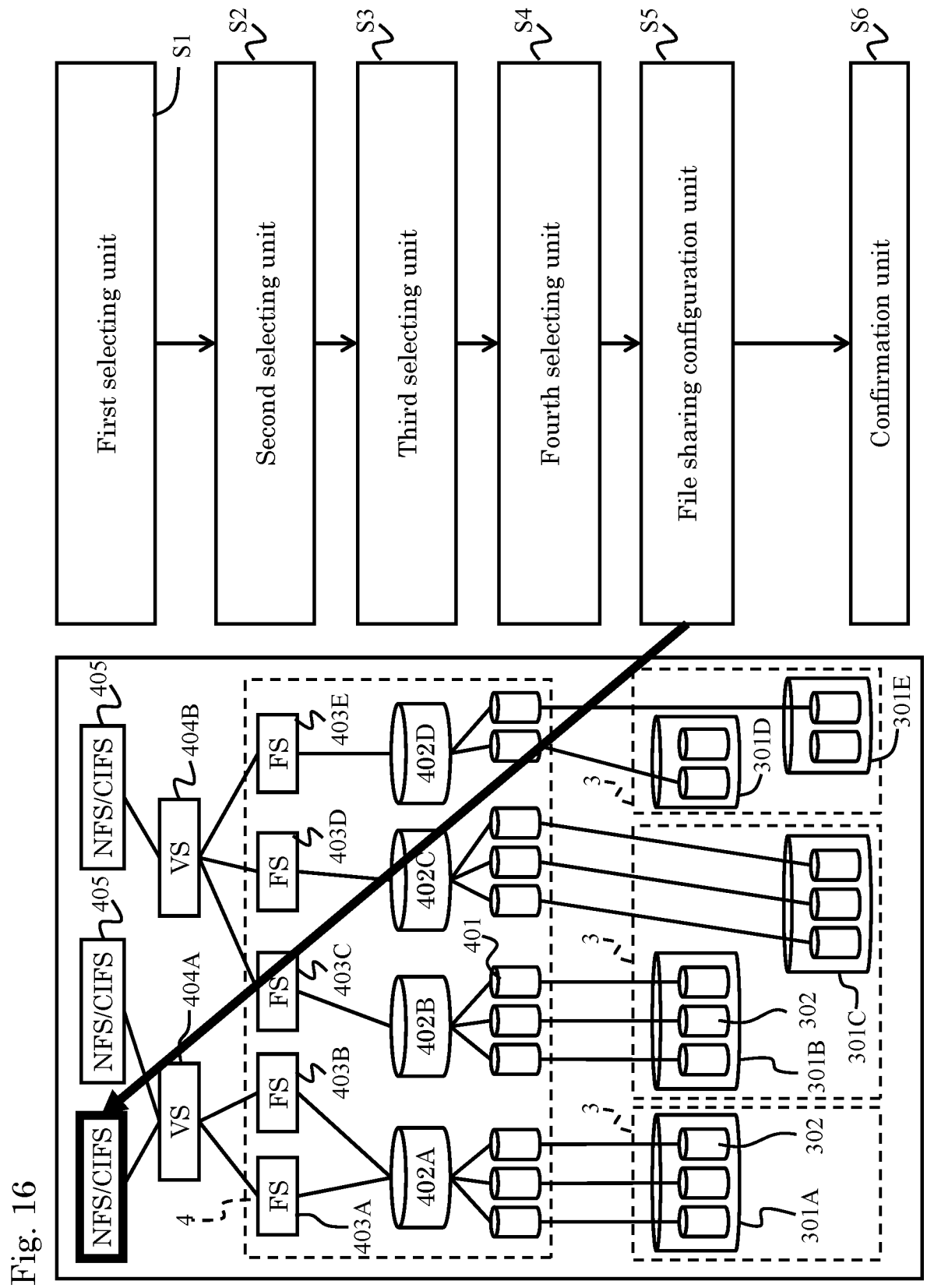
FIG. 16 is an explanatory diagram showing the steps of configuring a file sharing system.

FIG. 16 shows a process (S5) performed by the file sharing configuration unit 105. The file sharing configuration unit 105 configures the file sharing system 405 for the virtual server selected by the fourth selecting unit 104.

Then, once the user selects the task identifier C140 of the task management table T14 shown in FIG. 8, the confirmation unit 111 generates the confirmation screen G13 shown in FIG. 10 and provides this confirmation screen G13 to the client terminal 5 (S6).

Figure 17:
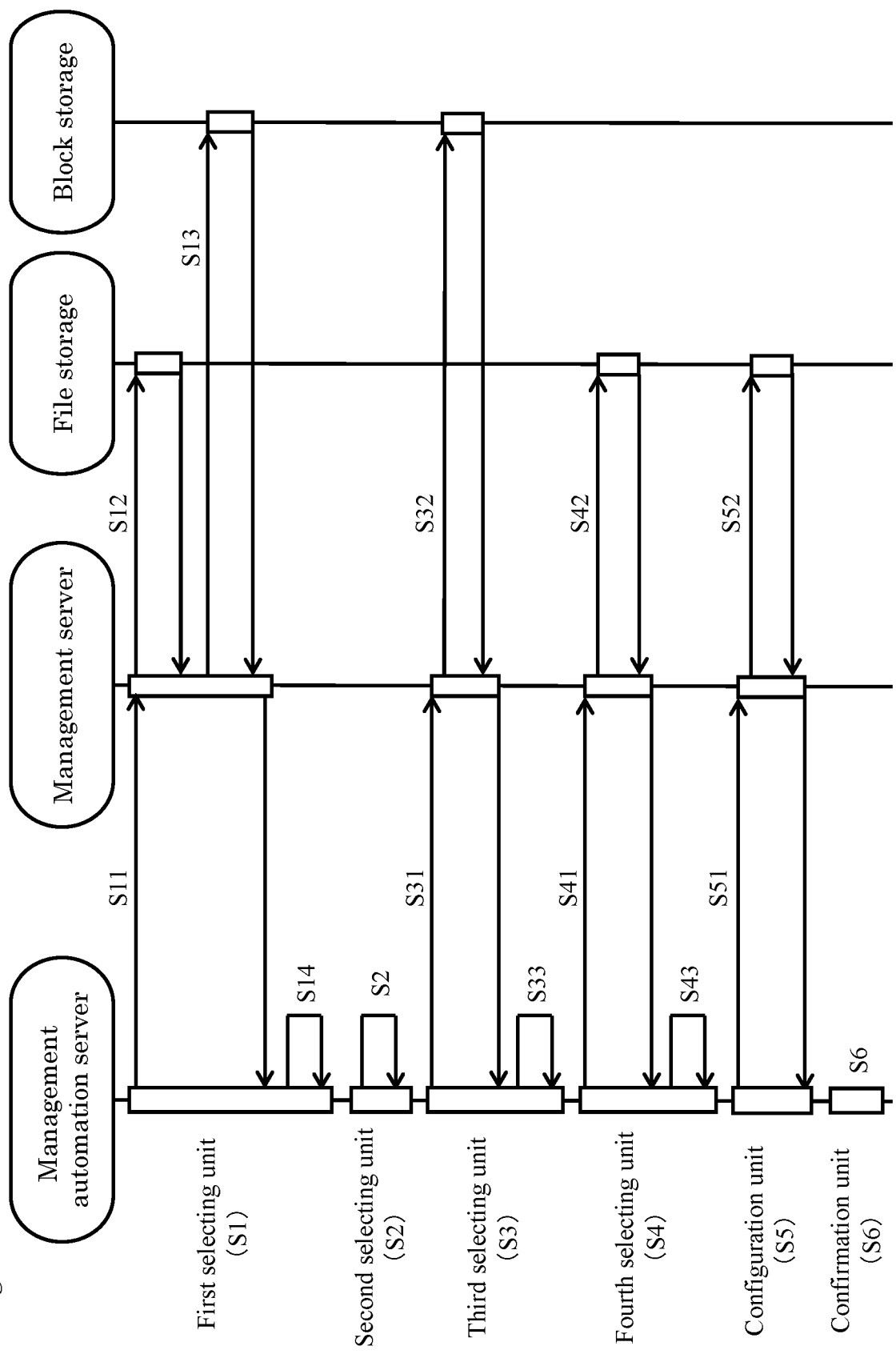
FIG. 17 is an explanatory diagram showing a flow of the entire process.

FIG. 17 shows the entire file sharing system configuration process described with reference to FIGS. 11 to 16. FIG. 17 shows one management server 2, one block storage 3, and one file storage 4, but the storage system can be provided with multiple management servers 2, multiple block storages 3, and multiple file storages 4, as described with reference to FIG. 2.

First of all, in the process S1 performed by the first selecting unit 101, the management automation server 1 notifies the management server 2 to confirm which block pool 301 is allocated to which file storage pool 402 (S11).

In response to the notification from the management automation server 1, the management server 2 confirms, with the file storage 4, association between each of the system drives 401 of the file storage pool 402 and each of the logical volumes 302 of a certain block pool 301 (S12). The management server 2 further confirms, with the block storage 3, association between each of the logical volumes 302 of the block pool 301 and each of the system drives 401 of a certain file storage pool 402 (S13).

After receiving the research result from the management server 2, the management automation server 1 extracts, from among the file storage pools 402, file storage pools 402 associated one-on-one with the block pools 301, as candidate pools (S14).

In the process S2 performed by the second selecting unit 102, the management automation server 1 selects, from among the extracted candidate pools 402, a file storage pool 402 that is permitted to be operated by the user and has a profile matching the value designated by the user (S2).

In the process S3 performed by the third selecting unit 103, the management automation server 1 requests the management server 2 to acquire information on the block pools 301 (S31). The management server 2 requests the block storage 3 for information on the block pools 301 corresponding to the candidate pools (pool utilization, pool availability), acquires the information on the block pools 301, and transmits the acquired information to the management automation server 1 (S32).

After receiving from the management server 2 the information on the block pools 301 corresponding to the candidate file storage pools 402, the management automation server 1 extracts one block pool 301 based on the pool utilization or pool availability, and selects one file storage pool 402 corresponding to the extracted block pool 301 (S33).

In the process S4 performed by the fourth selecting unit 104, the management automation server 1 requests the management server 2 to acquire information on the file systems 403 and the virtual servers 404 (S41). The management server 2 confirms with the file storage 4 the compositions of the file systems 403 and virtual servers 404 that concern the selected file storage pool 402, and reports the result thereof to the management automation server 1 (S42). The management automation server 1 selects a file system 403 or virtual server 404 (S43).

In the process S5 performed by the configuration unit 105, the management automation server 1 instructs the management server 2 to configure the file sharing system 405 (S51). The management server 2 instructs the file storage 4 to configure the file sharing system 405 and reports the result thereof to the management automation server 1 (S52).

Thereafter, in the process S6 performed by the confirmation unit 111, the user can confirm that the automation configuration of the file sharing system 405 has completed (S6).

According to the present embodiment composed as described above, the profiles used for the block pools 301 can be applied directly to the file storage pools 402, thereby realizing file system provisioning in view of the performances of the file storage pools 402.

Moreover, according to the present embodiment, by simply allowing the user to associate the file storage pool 402 one-on-one with the block pool 301 in advance, the user can configure the file system (file sharing system) automatically or semi-automatically in view of the performances of the file storage pools 402. Therefore, even with a large-scale storage system, efficiency of management tasks performed by the user can be improved.

Note that the present invention is not limited to the foregoing embodiment and includes various modifications. For example, the foregoing embodiment provides a clear description of the present invention, and the present invention does not have to include all of the compositions described in the embodiment. At least part of the compositions described in the embodiment can be changed to another composition or deleted. In addition, a new composition can be added to the embodiment as well.

Some or all of the functions and processes described in the embodiment may be realized as hardware circuits or software. The computer programs and various data may be stored not only in storage apparatuses provided within a computer but also in storage apparatuses provided outside the computer.

Furthermore, the present embodiment can be expressed as follows.

Expression 1

A storage management computer 1 (or 1 and 2) for managing a storage system, comprising:
a calculation unit that includes at least a microprocessor 11, and a communication interface circuit 14 which communicates with the storage system,
wherein the storage system has a plurality of first pools 402 for storing file data, and a plurality of second pools 301 for storing block data corresponding to the file data, and
the calculation unit has:
a first selecting unit 101 that extracts, from among the first pools 402, candidate pools that are candidates for a predetermined first pool associated one-on-one with any one of the second pools 301;
a second selecting unit 102 that selects, from among the candidate pools extracted by the first selecting unit 101, a candidate pool, whose characteristics relating to performance are equivalent to a value designated beforehand, as the predetermined first pool;
a third selecting unit 103 that, in a case where the predetermined first pool selected by the second selecting unit 102 is present in plurality, selects one of the plurality of predetermined first pools based on information concerning usage states of these predetermined first pools (e.g., pool utilization, pool availability); and
a file sharing configuration unit 105 that selects a predetermined file system associated with the predetermined first pool selected by the third selecting unit 103, and configures a file sharing system for the predetermined file system.

REFERENCE SIGNS LIST

1 Management automation server
2 Management server
3 Block storage
4 File storage
301 Block pool
302 Logical volume
401 System drive
402 File storage pool
403 File system
404 Virtual server
405 File sharing system

The invention claimed is:

1. A storage management method for managing a storage system by using a computer,
wherein the computer has at least a microprocessor, and a communication interface circuit which communicates with the storage system,
the storage system has a plurality of first pools for storing file data, and a plurality of second pools for storing block data corresponding to the file data, wherein the processor is configured to:
extract, from among the first pools, a plurality of candidate pools that are candidates for a predetermined first pool associated one-on-one with a second pool selected from among the second pools in response to a user instruction;
select, from among the extracted plurality of candidate pools, at least one of the plurality of candidate pools that a user has access and that match the predetermined first pool associated with one of the second pools, when configuration of a file sharing system is requested;
select, from among the at least one of the plurality of candidate pools, one candidate pool based on a plurality of information regarding usage states of the at least one of the plurality of candidate pools;
select, based on the selected one candidate pool, a predetermined file system associated with the predetermined first pool; and
configure a file sharing system for the predetermined file system,
wherein the calculation unit is configured to select, from among a plurality of file systems associated with the predetermined first pool, a file system with the lowest load as the predetermined file system.

2. The storage management computer according to claim 1, wherein the calculation unit is configured to:
extract, from among the first pools, a first pool associated with one of the second pools; and
select the extracted first pool as the predetermined first pool in a case where characteristics of the extracted first pool match designated characteristics.

3. The storage management computer according to claim 2, wherein a value of a performance index of the second pool with which the extracted first pool is associated, is used as the characteristics of the extracted first pool.

4. The storage management computer according to claim 3, wherein the characteristics further include authorization for a user operation on the extracted first pool, and the calculation unit is configured to select the extracted first pool as the predetermined first pool in a case where the value of the performance index of the second pool with which the first pool is associated matches a value of a designated performance index and the user operation is allowed to perform on the extracted first pool.

5. The storage management computer according to claim 3, wherein the calculation unit is configured to, in a case where the predetermined first pool is present in plurality, select one predetermined first pool from among the plurality of predetermined first pools based on at least a pool utilization or a pool availability.

6. The storage management computer according to claim 3, wherein the calculation unit is configured to configure the file sharing system for a virtual server associated with the predetermined file system.

7. The storage management computer according to claim 6, wherein the calculation unit is configured to extract a tiered first pool with a plurality of tiers configured therein out of the first pools, in a case where each of the tiers of the tiered first pool corresponds to each of different second pools, and is not allocated to any of the first pools other than the tiered first pool or any of virtual servers other than a virtual server configured for the tiered first pool.

8. The storage management computer according to claim 3, wherein the calculation unit is configured to select, from among a plurality of file systems associated with the predetermined first pool, a file system having a name matching a designated name, as the predetermined file system.

9. The storage management computer according to claim 3, wherein the storage system has:
a plurality of file storage apparatuses each having at least one of the first pools; and
a plurality of block storage apparatuses each having at least one of the second pools.

10. A storage management method for managing a storage system by using a computer, wherein the computer has at least a microprocessor, and a communication interface circuit which communicates with the storage system, the storage system has a plurality of first pools for storing file data, and a plurality of second pools for storing block data corresponding to the file data, the computer executing:

extracting, from among the first pools, a plurality of candidate pools that are candidates for a predetermined first pool associated one-on-one with a second pool selected from among the second pools in response to a user instruction;

selecting, from among the extracted plurality of candidate pools, at least one of the plurality of candidate pools that a user has access and that match the predetermined first pool associated with one of the second pools, when configuration of a file sharing system is requested;

selecting, from among the at least one of the plurality of candidate pools, one candidate pool based on a plurality of information regarding usage states of the at least one of the plurality of candidate pools;

selecting, based on the selected one candidate pool, a predetermined file system associated with the predetermined first pool; and configuring a file sharing system for the predetermined file system, wherein the calculation unit is configured to select, from among a plurality of file systems associated with the predetermined first pool, a file system with the lowest load as the predetermined file system.

11. A computer-readable recording medium in which is recorded a program for managing, by using a computer, a storage system that has a plurality of first pools for storing file data, and a plurality of second pools for storing block data corresponding to the file data, the program causing the computer to execute:

extracting from among the first pools, a plurality of candidate pools that are candidates for a predetermined first pool associated one-on-one with a second pool selected from among the second pools in response to a user instruction;

selecting, from among the extracted plurality of candidate pools, at least one of the plurality of candidate pools that a user has access and that match the predetermined first pool associated with one of the second pools, when configuration of a file sharing system is requested;

selecting, from among the at least one of the plurality of candidate pools, one candidate pool based on a plurality of information regarding usage states of the at least one of the plurality of candidate pools;

selecting, based on the selected one candidate pool, a predetermined file system associated with the predetermined first pool; and configuring a file sharing system for the predetermined file system, wherein the calculation unit is configured to select, from among a plurality of file systems associated with the predetermined first pool, a file system with the lowest load as the predetermined file system.

* * * * *